Dec. 25, 1945.    C. W. SMITH    2,391,486
AIRCRAFT SUPERCHARGING ARRANGEMENT
Filed Oct. 26, 1939
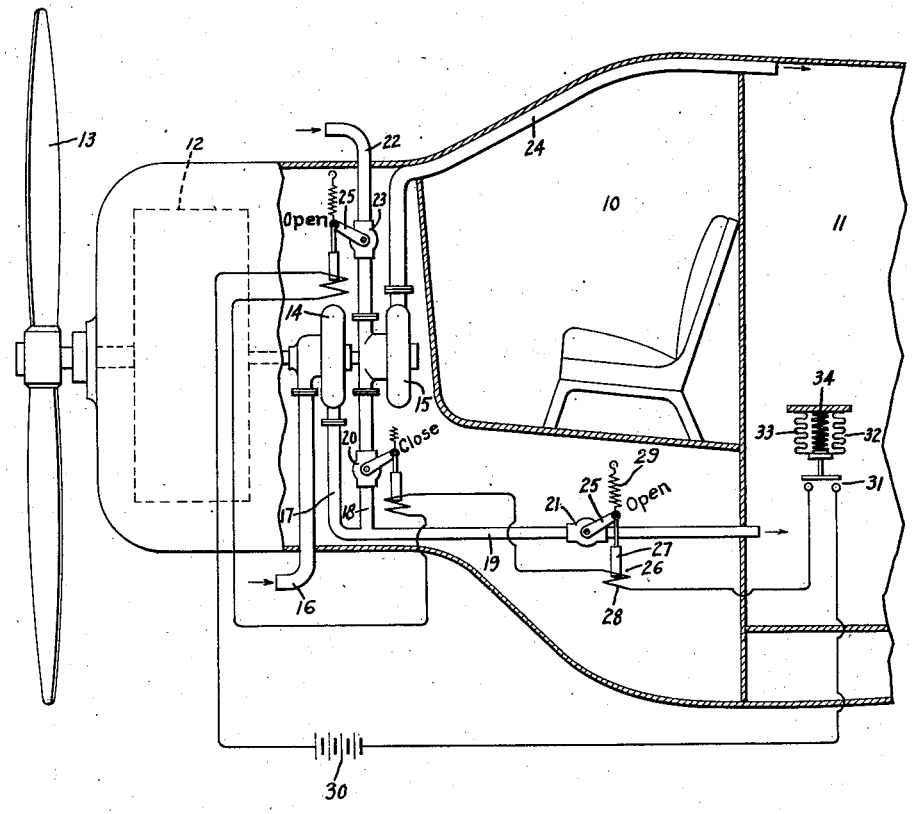
Inventor:
Chester W. Smith,
by Harry E. Dunham
His Attorney.

Patented Dec. 25, 1945

2,391,486

UNITED STATES PATENT OFFICE 2,391,486

AIRCRAFT SUPERCHARGING ARRANGEMENT

Chester W. Smith, Lynn, Mass., assignor to General Electric Company, a corporation of New York Application October 26, 1939, Serial No. 301,419

2 Claims. (Cl. 98—1.5)

This invention relates to aircraft supercharging arrangements including multi-stage superchargers for supplying air under pressure to a combustion engine, a sealed cabin, or like consumer. The supercharging of combustion engines renders the operation of such engines efficient at varying altitudes and the supercharging of sealed cabins for the pilot and the passengers at high altitudes eliminates the ill effect on passengers due to low atmospheric pressure. In the case of multi-stage supercharging arrangements it has been customary heretofore to connect these stages in series at high altitudes and to disconnect one of the stages or render it inoperative at low altitudes. In arrangements of this kind difficulty is experienced at low altitudes if the supercharger stage or stages for operation at such low altitudes fail.

The object of my invention is to provide an improved supercharger arrangement whereby aircraft may be effectively supercharged at low altitude upon failure of one of the supercharger stages. This is accomplished in accordance with my invention by the provision of a multi-stage supercharging arrangement including at least two stages and means for connecting the stages in parallel at low altitudes and connecting them in series at high altitudes. The change from parallel to series operation and vice-versa is preferably accomplished automatically by a device responsive to variations in altitude or like operating condition.

For a better understanding of what I believe to be novel and my invention, attention is directed to the following description and the claims appended thereto in connection with the accompanying drawing.

The single figure of the drawing illustrates an aircraft supercharger arrangement embodying my invention.

The arrangement comprises an aircraft with a pilot cabin 10 and a passenger cabin 11. The aircraft is operated by a combustion engine 12 driving a propeller 13. A consumer, in the present instance the passenger cabin 11, is supercharged by a supercharging arrangement which in the present example includes two compressors or compressor stages 14 and 15, each having an impeller driven from the crank shaft of the combustion engine 12. Means are provided for alternately connecting the two compressors or compressor stages 14, 15 in parallel and in series. To this end the first compressor or compressor stage 14 has an inlet conduit 16 for receiving air to be compressed and a discharge conduit 17 with branches 18 and 19 including valves 20 and 21 respectively for connecting the first compressor or compressor stage 14 either to the inlet of the second compressor or compressor stage 15 or to the cabin 11. The second compressor or compressor stage 15 has an inlet which may be connected to the outlet of the first compressor by the aforementioned branch conduit 18 or directly to the atmosphere by a conduit 22 with a valve 23. The outlet of the second compressor 15 is connected by a conduit 24 to the cabin 11.

The valves 20, 21 and 23 are shown in a position in which the two compressors are connected in parallel, the valve 20 being closed and the valves 21 and 23 open. Under this condition the compressors 14 and 15 receive air directly from the atmosphere through the inlet conduits 16 and 22 respectively and they discharge compressed air to the cabin 11 through the discharge conduits 19 and 24. Upon reversing of the valves, that is, opening of valve 20 and closing of valves 21 and 23, the compressors are connected in series. Under this condition the air compressed by the first compressor 14 is discharged through the branch conduit 18 into the inlet of the second compressor 15 to be further compressed in the latter and discharged therefrom through the conduit 24 to the cabin 11.

The operation of the valves is preferably effected automatically. To this end each valve is provided with an arm 25 connected to an electric relay 26. Each relay has a core 27 mechanically connected to the arm 25 and an operating coil 28. Biasing springs 29 are connected to the arms 25 so as to bias the valves 21 and 23 towards opening position and the valve 20 towards closing position. Thus, with the operating coils 28 of the different relays deenergized, the two compressors or compressor stages are connected in parallel.

The operating coils 28 of the different relays are connected in series in an electric circuit which includes a source of energy 30 and a contact-making device 31. Closing of the contact-making device causes energization of the operating coils 28 whereby the positions of the valves are reversed against the biasing forces of the springs 29. The contact-making device 31 is operated automatically by a device responsive to variations of an operating condition, in the present example a device 32 located in the cabin 11 and responsive to pressure changes therein. The device 32 comprises an evacuated bellows 33 and a spring 34 preventing the bellows from collapsing. The upper end of the device 33 is fixed and the lower end of the bellows 32 is connected to a movable member of the contact-making device 31. During operation the compressors 14 and 15 are normally connected in parallel, both operating independently from each other and supplying air under pressure to the cabin 11. With increasing altitude the pressure in the cabin 11 decreases, thereby causing the bellows 33 to expand and as the pressure in the cabin 11 reaches a certain low value the device 32 effects closing of the contact-making device 31. This closes the electric circuit for the relays 26 and, as pointed out above, reverses the positions of the valves to change the connection of the compressors 14 and 15 from parallel to series connection.

What I claim as new and desire to secure by Letters Patent of the United States is:

1. In an aircraft, the combination of means forming a compartment requiring air under pressure during flight of the aircraft and from which compartment said air is consumed during operation of the aircraft, compressor means having first and second stages, conduit means for connecting said compressor means to said compartment to supply compressed air thereto, said last named means including valves arranged to connect the compressor stages in parallel in one position of the valves and in series in another position of the valves, and means for operating said valves including a relay for each valve, an electric circuit for the relays including a contact making and breaking member and a pressure responsive device subject to pressure changes in the compartment and connected to said contact making and breaking member for automatically reversing the valve positions upon the compartment pressure dropping to a predetermined low value to connect the stages in series.

2. In an aircraft, the combination of means forming a compartment requiring air under pressure during flight of the aircraft and from which compartment said air is consumed during operation of the aircraft, an engine, two compressors driven from the engine, conduit means for connecting the compressors to the compartment to supply compressed air thereto, said conduit means including valves arranged to connect the compressors in parallel in one position of the valves during operation at low altitude and in series in another position of the valves during operation at high altitude, and means for operating said valves including a device responsive to the air pressure in the compartment for automatically positioning the valves to connect the compressors in parallel in response to a predetermined high value of the compartment pressure and for automatically reversing the valve position to connect the compressors in series in response to a predetermined low value of the compartment pressure.

CHESTER W. SMITH.